United States Patent
Viktorov

(10) Patent No.: US 11,019,082 B2
(45) Date of Patent: May 25, 2021

(54) PROTECTION FROM MALICIOUS AND/OR HARMFUL CONTENT IN CLOUD-BASED SERVICE SCENARIOS

(71) Applicant: F-Secure Corporation, Helsinki (FI)

(72) Inventor: Dmitriy Viktorov, Espoo (FI)

(73) Assignee: F-Secure Corporation, Helsinki (FI)

( * ) Notice: Subject to any disclaimer, the term of this patent is extended or adjusted under 35 U.S.C. 154(b) by 168 days.

(21) Appl. No.: 15/712,244

(22) Filed: Sep. 22, 2017

(65) Prior Publication Data

US 2018/0097832 A1      Apr. 5, 2018

(30) Foreign Application Priority Data

Sep. 30, 2016   (GB) ..................................... 1616665

(51) Int. Cl.
*H04L 29/06* (2006.01)

(52) U.S. Cl.
CPC ........ *H04L 63/1425* (2013.01); *H04L 63/145* (2013.01)

(58) Field of Classification Search
CPC .......................... H04L 63/1425; H04L 63/145
See application file for complete search history.

(56) References Cited

U.S. PATENT DOCUMENTS

| | | | | |
|---|---|---|---|---|
| 8,370,939 B2* | 2/2013 | Zaitsev | ................... | G06F 21/56 726/23 |
| 8,739,281 B2* | 5/2014 | Wang | ..................... | G06F 21/552 709/224 |
| 8,800,011 B2* | 8/2014 | Bray | .................... | H04L 61/1511 709/223 |
| 9,037,661 B2* | 5/2015 | Gracy | ................... | G06Q 10/107 709/206 |
| 9,332,025 B1* | 5/2016 | Watson | ................ | H04L 63/1408 |
| 9,342,353 B2* | 5/2016 | Cherel | .................... | G06F 9/468 |
| 9,413,782 B1* | 8/2016 | Adams | .................. | H04L 63/145 |
| 9,560,010 B1* | 1/2017 | Estes | .................... | H04L 63/0209 |
| 9,690,933 B1* | 6/2017 | Singh | ..................... | G06N 5/045 |
| 10,057,084 B2* | 8/2018 | Mithyantha | .............. | H04L 67/10 |
| 10,142,362 B2* | 11/2018 | Weith | .................. | H04L 63/1433 |
| 10,425,411 B2* | 9/2019 | Huang | ................ | H04L 41/0806 |
| 10,594,656 B2* | 3/2020 | Devarajan | ........... | H04L 63/0218 |

(Continued)

FOREIGN PATENT DOCUMENTS

WO     WO 2016/039885 A1     3/2016

OTHER PUBLICATIONS

Oberheide, Jon, et al., "CloudAV: N-Version Antivirus in the Network Cloud", 2008, University of Michigan, 16 pgs.

*Primary Examiner* — Saleh Najjar
*Assistant Examiner* — Devin E Almeida
(74) *Attorney, Agent, or Firm* — Harrington & Smith

(57) ABSTRACT

There are provided measures for protection from malicious and/or harmful content in cloud-based service scenarios. Such measures exemplarily include detecting a transmission attempt of a file between a file service cloud entity and a remote accessing entity, identifying said file, checking for presence of a security threat scan result for said file in a scan result memory based on a result of said identifying, and transmitting, based on a result of said checking, a security threat scan task for said file to a security cloud entity connected to said file service cloud entity.

20 Claims, 9 Drawing Sheets

(56) References Cited

U.S. PATENT DOCUMENTS

| | | | |
|---|---|---|---|
| 2010/0169972 A1* | 7/2010 | Kuo | G06F 21/564 726/23 |
| 2012/0179909 A1* | 7/2012 | Sagi | H04L 63/045 713/167 |
| 2012/0304277 A1* | 11/2012 | Li | H04L 63/0281 726/12 |
| 2013/0191914 A1* | 7/2013 | Dubrovsky | H04L 63/0245 726/22 |
| 2013/0238545 A1* | 9/2013 | Fuchs | G06Q 10/00 706/47 |
| 2013/0304697 A1* | 11/2013 | Movida | G06F 16/27 707/610 |
| 2014/0259093 A1* | 9/2014 | Narayanaswamy | H04L 63/0272 726/1 |
| 2015/0205964 A1* | 7/2015 | Eytan | G06F 21/568 726/23 |
| 2015/0319182 A1* | 11/2015 | Natarajan | H04L 63/145 726/24 |
| 2016/0048683 A1* | 2/2016 | Sanders | G06F 21/566 726/23 |
| 2016/0380977 A1* | 12/2016 | Bean | H04L 63/1408 726/12 |
| 2017/0070506 A1* | 3/2017 | Reddy | H04L 63/10 |

\* cited by examiner

PROTECTION FROM MALICIOUS AND/OR HARMFUL CONTENT IN CLOUD-BASED SERVICE SCENARIOS

FIELD

The present invention relates to protection from malicious and/or harmful content in cloud-based service scenarios. More specifically, the present invention relates to measures (including methods, apparatuses and computer program products) for realizing protection from malicious and/or harmful content in cloud-based service scenarios.

BACKGROUND

The present specification generally relates to security in relation to data uploaded to a file service cloud (i.e. a cloud-based service entity providing at least (but not limited to) file services, e.g. download and upload of files) and stored there and/or downloaded from the cloud via several interfaces and transmission services. In modern communication networks, security is a vital issue, and attacks on network and data security tend to be increasing in terms of both number and complexity.

Salesforce.com ("Salesforce") is the most commonly used enterprise cloud ecosystem. It is noted that although problems underlying the present invention are explained on the basis of Salesforce as an example of a file service cloud (or more general a cloud providing e.g. software as a service (SaaS), platform as a service (PaaS)), these problems presently also arise from comparable other cloud solutions.

Salesforce has started as a customer relationship management (CRM) software in the cloud, and turned into PaaS, allowing organizations design and customize their business processes without no software evolved.

According to this concept, leveraging Salesforce application programming interfaces (API), Apex (a proprietary Java®-like programming language), and VisualForce® (a special tool to design Salesforce user interface (UI) pages), organizations can extend functionality of Salesforce platform and integrate it with internal/external systems.

Salesforce provides for an easy installation of applications to enhance the Salesforce basic system of a certain customer. The applications are provided by an application exchange service ("AppExchange").

Examples for such applications range from integrations with various systems (such as MS Office 365®, Dropbox®, Evernote®) to encryption, data loss prevention, user activity and monitoring.

Being a business platform for many organizations enabling direct interaction for and with their partners and customers, Salesforce as well as similar platforms are assumed to be an attractive target for cyber criminals to conduct targeted attacks. Attackers may for example use the platform as a stepping stone to get inside organization networks via respective cloud services. For example, one possible scenario of such an attack would be by sending an email message with a specifically crafted document or a web link to the organization's customer care/support system, tempting a support engineer to open it.

Providing means impeding or avoiding such attack and being able to interact with the cloud's basic system via established interfaces would increase security of the cloud system.

Accordingly, it is a general task of the present application to provide for such security increasing measures.

Known approaches being so-called cloud access security brokers (CASB) which may be implemented as Hyper Text Transfer Protocol Secure (HTTPS) reverse-proxy acting as a gateway (GW) 13 between a client/user (i.e. a remote accessing entity) 11 and the cloud (e.g. a file service cloud entity) 12 as shown in FIG. 1. An obvious weakness of the approach using CASB is that an attacker can bypass the GW 13 and connect the cloud 12 directly.

In a different approach, in incoming file upon an upload is scanned utilizing resources of the cloud during the upload handling. However, according to such approach a risk and thus a problem arises that malicious or harmful content might not be detected immediately in a file upon an upload. As an example for such situation, there might be unknown zero-day vulnerability exploited by malware that an antivirus or other security tool cannot detect until the exploit becomes available for security researchers. Hence, there is a potential risk that even later on (after the exploit became available for security researchers) the malicious or harmful content may be downloaded by users to their computers and malware may spread inside organization.

A multi-tenant cloud platform like Salesforce (and similar cloud systems) puts some constraints on how malware scanning and advanced threat analysis can be implemented in efficient way. Further, the above-mentioned Apex runtime engine may enforce governor limits to ensure that 3rd party code and processes does not monopolize shared resources.

Hence, the problem arises that efficient and reliable scanning of files uploaded or downloaded to/from a cloud platform like the Salesforce platform is required.

SUMMARY

Various exemplifying embodiments of the present invention aim at addressing at least part of the above issues and/or problems and drawbacks.

In particular, according to these embodiments, a reliable protection against malware, advanced threats, and even data leakage can be provided without significant impact to performance and user experience in respect to the basic cloud service.

Various aspects of exemplifying embodiments of the present invention are set out in the appended claims.

According to an exemplary aspect of the present invention, there is provided a method of a direct service integration entity in a file service cloud entity, the method comprising at the direct service integration entity: detecting a transmission attempt of a file between said file service cloud entity and a remote accessing entity, identifying said file, checking for presence of a security threat scan result for said file in a scan result memory based on a result of said identifying, and transmitting, based on a result of said checking, a security threat scan task for said file to a security cloud entity connected to said file service cloud entity.

According to an exemplary aspect of the present invention, there is provided an apparatus comprising a memory configured to store computer program code, and a processor configured to read and execute computer program code stored in the memory, wherein the processor is configured to cause the apparatus to perform detecting a transmission attempt of a file between said file service cloud entity and a remote accessing entity, identifying said file, checking for presence of a security threat scan result for said file in a scan result memory based on a result of said identifying, and transmitting, based on a result of said checking, a security threat scan task for said file to a security cloud entity connected to said file service cloud entity.

According to an exemplary aspect of the present invention, there is provided a computer program product comprising computer-executable computer program code which, when the program is run on a computer (e.g. a computer of an apparatus according to the aforementioned apparatus-related exemplary aspect of the present invention), is configured to cause the computer to carry out the method according to the aforementioned method-related exemplary aspect of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects solve at least part of the problems and drawbacks identified in relation to the prior art. Further developments and/or modifications of the aforementioned example aspects of the present invention are set out herein with reference to the drawings and exemplifying embodiments of the present invention.

By way of exemplifying embodiments of the present invention, there is provided protection from malicious and/or harmful content in cloud-based service scenarios. More specifically, by way of exemplary embodiments of the present invention, there are provided measures and mechanisms for realizing protection from malicious and/or harmful content in cloud-based service scenarios.

Thus, improvement is achieved by methods, apparatuses and computer program products enabling/realizing protection from malicious and/or harmful content in cloud-based service scenarios.

BRIEF DESCRIPTION OF THE DRAWINGS

In the following, the present invention will be described in greater detail by way of non-limiting examples with reference to the accompanying drawings, in which.

Figure 1:
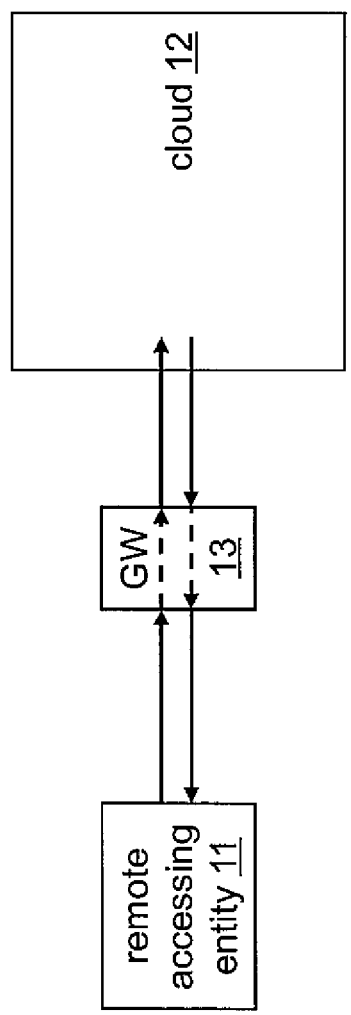
FIG. 1 is a block diagram illustrating an example of a system environment with signaling variants according to the cloud access security broker approach.

DETAILED DESCRIPTION OF DRAWINGS
AND EMBODIMENTS OF THE PRESENT
INVENTION

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for (enabling/realizing) protection from malicious and/or harmful content in cloud-based service scenarios.

Figure 2:
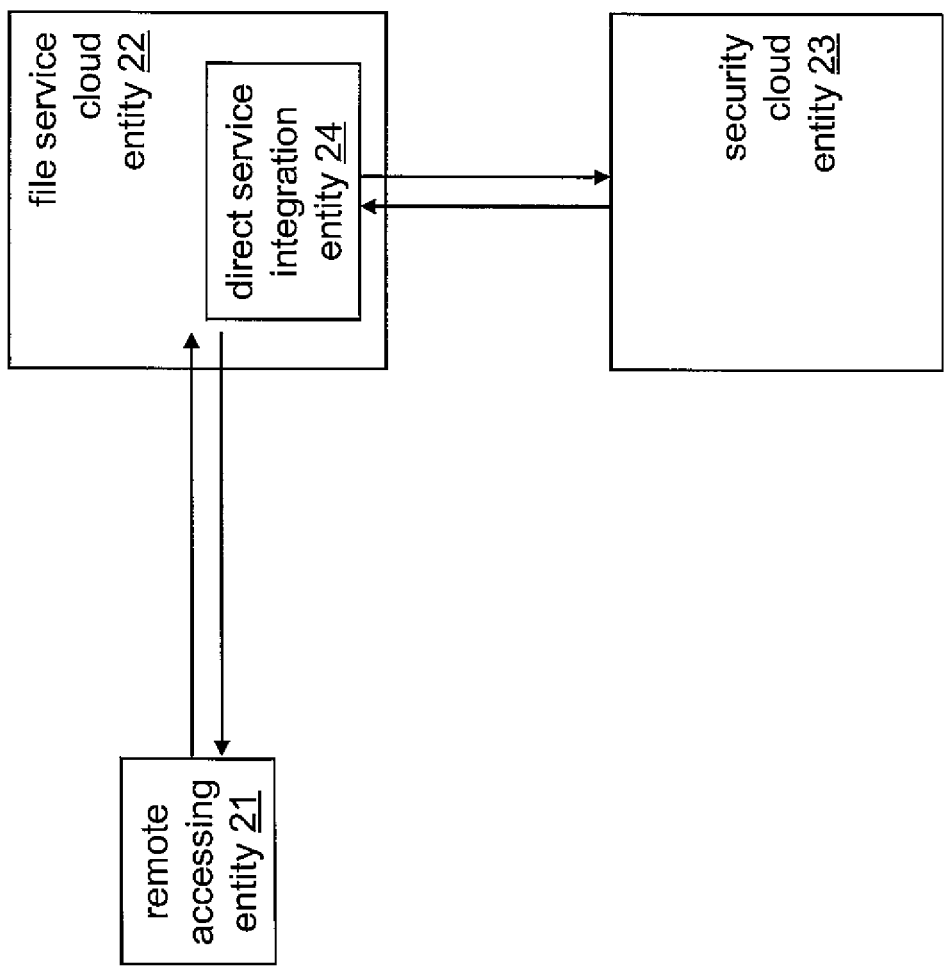
FIG. 2 shows a schematic diagram of an example of a system environment with signaling variants according to exemplary embodiments of the present invention.

FIG. 2 shows a schematic diagram illustrating a system configuration underlying exemplifying embodiments of the present invention.

According to FIG. 2, in its most basic form, a remote accessing entity 21 is connected to a (file) service cloud entity 22 which provides at least file storage capability for the remote accessing entity 21.

The remote accessing entity 21 may be any user device which is capable of being connected to the service cloud entity 22.

The service cloud entity 22 provides cloud services like Salesforce cloud framework, but is not limited to this implementation. As mentioned above, the service cloud entity 22 may provide any arbitrary cloud service (assembly).

In case of Salesforce, the remote accessing entity 21 may be a terminal running e.g. a Salesforce web application or a Salesforce mobile application. The remote accessing entity 21 may further be a cloud/enterprise system connected via representational state transfer (REST) API and/or simple object access protocol (SOAP) API to the service cloud entity 22. The remote accessing entity 21 may further be an email and/or collaboration system connected via simple mail transfer protocol (SMTP) and/or simple mail transfer protocol secure (SMTPS) protocols to the service cloud entity 22.

The service cloud entity 22 may be provided with means hooking into the basic cloud service by means of objects, classes, triggers, links, etc. utilizing interfaces provided by the basic cloud service. In particular, the service cloud entity 22 may be provided with a direct service integration entity 24. The service cloud entity 22 provides interfaces, which are then used by the direct service integration entity 24 to intercept content and to send it over to a security cloud entity 23 which provides at least file scanning capability. Additionally, the direct service integration entity 24 employs an optimization apparatus (like caching) for example to avoid sending content which has been recently scanned.

Thereby, the service cloud entity 22 is connected to a security cloud entity 23 (via the direct service integration entity 24). The security cloud entity 23 may further provide file reputation determination capability, uniform resource locator (URL) reputation determination capability, URL categorization capability, and/or advanced threat analysis capability.

That is, the direct service integration entity 24 allows to intercept files uploaded or downloaded to/from the cloud service and to inspect the files for malware and other threats.

Either of the service cloud entity 22 (and in particular the direct service integration entity 24 thereof) and the security cloud entity 23 may be embodied by an apparatus 40 discussed below in relation to FIG. 4.

Figure 3:
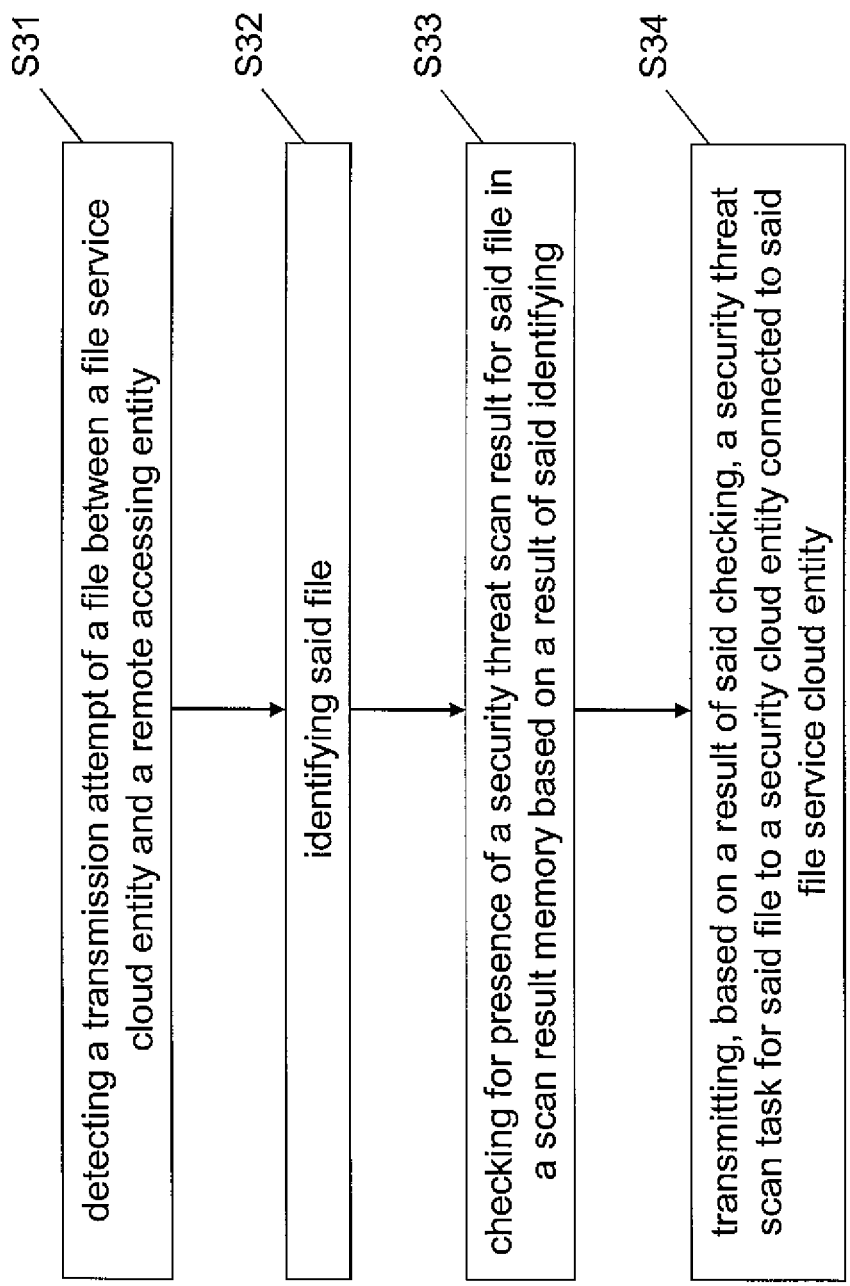
FIG. 3 is a schematic diagram of a procedure according to exemplary embodiments of the present invention.

FIG. 3 is a schematic diagram of a procedure for realizing a file service cloud entity side component (namely the direct service integration entity 24) according to exemplary embodiments of the present invention.

As shown in FIG. 3, such a procedure according to exemplifying embodiments of the present invention comprises various operations at the direct service integration entity 24 illustrated in FIG. 2.

As shown in FIG. 3, a procedure according to exemplary embodiments of the present invention comprises an operation of detecting (S31) a transmission attempt of a file between a file service cloud entity and a remote accessing entity, an operation of identifying (S32) said file, an operation of checking (S33) for presence of a security threat scan result for said file in a scan result memory based on a result of said identifying, and an operation of transmitting (S34), based on a result of said checking, a security threat scan task for said file to a security cloud entity connected to said file service cloud entity.

According to a variation of the procedure shown in FIG. 3, exemplary additional operations are given, which are inherently independent from each other as such. According to such variation, an exemplary method according to exemplary embodiments of the present invention may comprise an operation of receiving, from said security cloud entity, said security threat scan result for said file as a result of said security threat scan task for said file, and an operation of storing said security threat scan result for said file in said scan result memory.

According to a variation of the procedure shown in FIG. 3, said security threat scan result is provided with a time to live. According to such variation, an exemplary method according to exemplary embodiments of the present invention may further comprise an operation of removing said security threat scan result from said scan result memory, if said time to live is expired.

According to a variation of the procedure shown in FIG. 3, exemplary details of the identifying operation (S32) are given, which are inherently independent from each other as such.

Such exemplary identifying operation (S32) according to exemplary embodiments of the present invention may comprise an operation of calculating a hash value for said file as an identifier of said file. Such hash value may be an SHA1 value, i.e., a hash value calculated utilizing an SHA1 method.

According to a variation of the procedure shown in FIG. 3, exemplary additional operations are given, which are inherently independent from each other as such. According to such variation, an exemplary method according to exemplary embodiments of the present invention may comprise an operation of evaluating said security threat scan result for said file.

According to a variation of the procedure shown in FIG. 3, exemplary details of the detecting operation (S31) are given, which are inherently independent from each other as such.

Such exemplary detecting operation (S31) according to exemplary embodiments of the present invention may comprise an operation of receiving a trigger indicative of that said file is uploaded from said remote accessing entity to said file service cloud entity.

According to a variation of the procedure shown in FIG. 3, exemplary details of the evaluating operation are given, which are inherently independent from each other as such.

Such exemplary evaluating operation according to exemplary embodiments of the present invention may, in case said file is assessed as malicious, comprise an operation of at least one of initiating an alert (e.g. to a user, an admin, etc., via e.g. an email or another communication channel), removing said file from said file service cloud entity, and moving said file into a quarantine section of said file service cloud entity.

According to a variation of the procedure shown in FIG. 3, exemplary details of the detecting operation (S31) are given, which are inherently independent from each other as such.

Such exemplary detecting operation (S31) according to exemplary embodiments of the present invention may comprise an operation of receiving a trigger indicative of that said file is requested to be downloaded from said file service cloud entity to said remote accessing entity, and an operation of setting a download allowance state for said file such that download of said file is prohibited.

According to a variation of the procedure shown in FIG. 3, exemplary details of the evaluating operation are given, which are inherently independent from each other as such.

Such exemplary evaluating operation according to exemplary embodiments of the present invention may comprise an operation of setting said download allowance state for said file such that said download of said file is permitted, in case said file is assessed as not malicious.

In the following, exemplary embodiments of the present invention as discussed above are explained in more detail under reference to FIGS. 5 to 9. For such explanation, the above-mentioned scenario related to Salesforce is used. However, it is noted that the present invention is not limited to an application to Salesforce but may be implemented for comparable other cloud systems as well.

Figure 5:
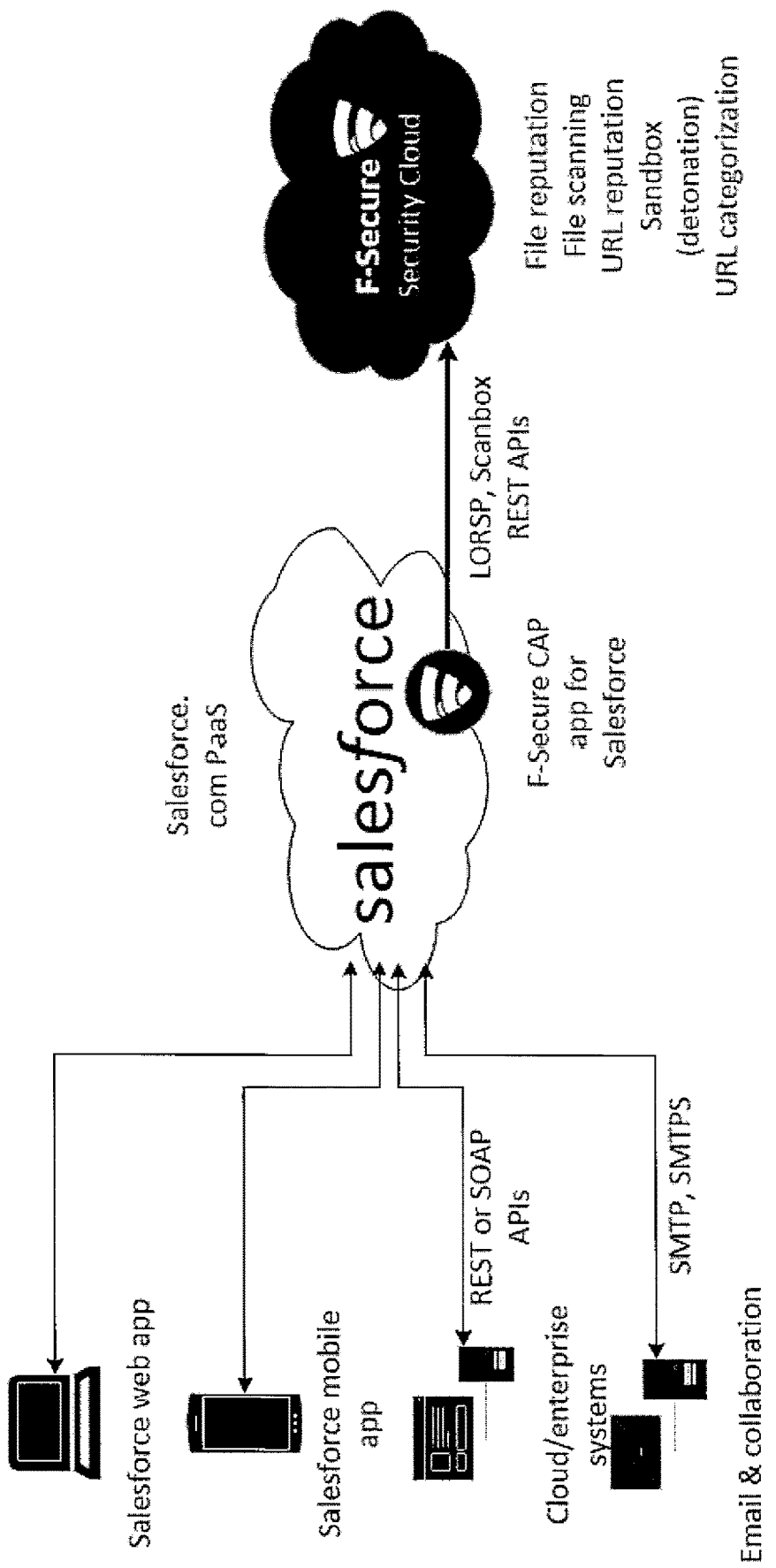
FIG. 5 is a schematic diagram of a system environment according to exemplary embodiments of the present invention.

FIG. 5 is a schematic diagram of a system environment according to exemplary embodiments of the present invention.

In particular, FIG. 5 shows a system including components according to the present invention to protect Salesforce customers.

Here, it is noted that the stations (e.g. terminals, mobile devices) illustrated on the left correspond to the remote accessing entity 21 of FIG. 2.

Further, the Salesforce cloud shown in the middle corresponds to the file service cloud entity 22 of FIG. 2. It is noted that the F-Secure app for Salesforce illustrated nearby the Salesforce cloud corresponds to the means hooking into the basic cloud service by means of objects, classes, triggers, links, etc. utilizing interfaces provided by the basic cloud service (i.e., the direct service integration entity 24 of FIG. 2), and embodies the procedure described above in relation to FIG. 3.

Further, the F-Secure Security Cloud shown on the right corresponds to the security cloud entity 23 of FIG. 2.

According to exemplary embodiments of the present invention, the above-mentioned means hooking into the basic cloud service (the direct service integration entity 24) may be embodied by the F-Secure application obtained from the Salesforce AppExchange and deployed to the customers Salesforce environment(s).

According to exemplary embodiments of the present invention, during the deployment, F-Secure application creates custom objects, adds Apex classes and triggers on FeedItem, ContentVersion and other Salesforce standard and custom objects. The deployment script also adds F-Secure Security Cloud endpoint URLs to the Salesforce remote sites in order to enable REST API callouts.

Once F-Secure application is successfully installed, all files uploaded or downloaded to/from Salesforce are going to be scanned for malware and other advanced threats. According to exemplary embodiments of the present invention, it can be defined which file types, users or devices are excluded from scanning.

As is derivable from FIG. 5, the actual malware scanning and advanced threat analysis are off-loaded from the file service cloud entity 22 (Salesforce cloud) to the security cloud entity 23 (F-Secure Security Cloud).

The F-Secure Security Cloud may provide multiple security services such as file reputation, malware scanning, URL reputation and categorization, advanced threat analysis (also known as "detonation in sandbox"). F-Secure application (i.e., the direct service integration entity 24) interacts with F-Secure Security Cloud service over REST-based APIs.

While above the means hooking into the basic cloud service is described as being embodied by the F-Secure application, other embodiments in which hardware components dedicated to these means (i.e., the direct service integration entity 24) are added to the file service cloud (as the file service cloud entity) are encompassed as well. It is conceivable for the skilled person that these hardware components are not limited to functionality related to the F-Secure application, but instead may provide additional functionality.

Subsequently, details how file uploads and downloads are handled by component(s) of the direct service integration entity 24 (exemplarily embodied by the F-Secure application) are described under reference to FIG. 6 (upload) and FIG. 7 (download).

Figure 6:
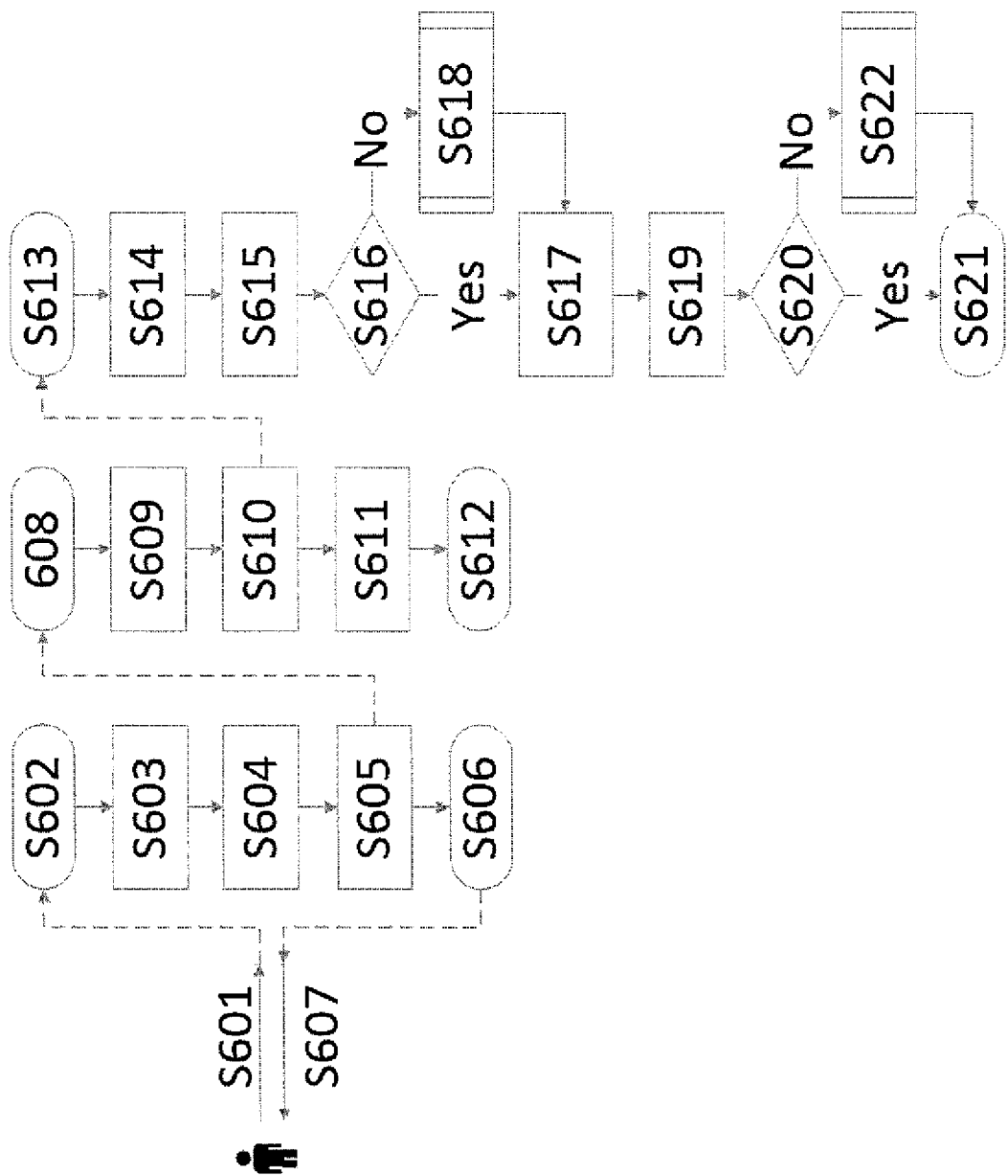
FIG. 6 is a schematic diagram of a procedure according to exemplary embodiments of the present invention.

FIG. 6 is a schematic diagram of a procedure according to exemplary embodiments of the present invention.

Namely, according to FIG. 6, main steps involved in processing a file (uploaded to Salesforce from his/her device with e.g. the web browser or mobile application) according to exemplary embodiments of the present invention are depicted. It is noted that the files may be uploaded e.g. by means of Salesforce's Chatter, Files, Libraries, Content and Notes&Attachments pages.

With respect to FIG. 6, it is noted that the dashed lines point to steps, which happen in background and may be initiated by the Salesforce platform, such as calling trigger handlers and running scheduled/queueable jobs. Further, processing file upload is mainly asynchronous. However, according to exemplary embodiments of the present invention, the user may get status/confirmation on the file upload as soon as it is complete. The actual malware scanning starts after the file is uploaded to Salesforce platform.

As is derivable from FIG. 6, several triggers are fired, SHA1 checksums are calculated and compared (thereby identifying already present scanning results), and if no scanning result for an uploaded file is determined as being already present, a scanning task is given to the security cloud entity 23, and the content of the found scanning result or a scanning result delivered by the security cloud entity 23 in response to the task is used for further steps in relation to security regarding the file in question (i.e. considering the file as safe, considering the file as unsafe, initiating administrator specified actions).

More specifically, in step S601, the user uploads a file to Salesforce with the web browser or mobile app.

Further, in step S602, an Apex trigger is fired for a FeedItem/ContentVersion object with a Content ID. Further, in step S603, SHA1 checksum of the file by the given content ID is calculated. Furthermore, in step S604, a new ContentScanJob object with is created status "New" and the content ID. Subsequently, in step S605, the new ContentScanJob object is added with the content ID and SHA1 checksum to the database. Further, in step S606, the FeedItem or ContentVersion trigger execution is complete.

Finally, in step S607, the user gets confirmation that the file upload is complete (ok).

Starting from step S605, in step S608, an Apex trigger is fired for new ContentScanJob object(s).

In step S609, the SHA1 checksum of content is calculated, if it is not available, and the ContentScanJob object is updated. In step S610, a new Scan Queueable Apex job is created with the list of SHA1 checksums. Further, in step S611, the status of ContentScanJob object to is updated to status "Pending".

Finally, in step S612, the ContentScanJob trigger execution is complete.

Starting from step S610, in step S613, Salesforce executes the Scan Queueable Apex job.

In step S614, the list of SHA1 checksums passed to the job is got. Further, in step S615, it is looked for Scan Result Cache objects with previous scan results by given SHA1 checksums.

In step S616, it is checked whether previous scan results are found? If so, in step S617, ContentScanJob objects are found by SHA1 checksums and the status is updated to status "Complete" along with the scan result. If no previous scan results are found in step S616, in step S618, F-Secure Security Cloud API(s) is/are called to scan content for malware and advanced threats. Subsequently, step S617 is performed.

In step S619, scan results are recorded to the Scan Log.

In step S620, it is checked whether the content is found safe? If so, in step S621, the Scan Queueable Apex job is complete. If the content is not found safe in step S620, in step S622, an admin specified action is taken, i.e., sending email alert to the user/admin, removing/quarantining the original content. Afterwards, the Scan Queueable Apex job is complete (S621).

Figure 7:
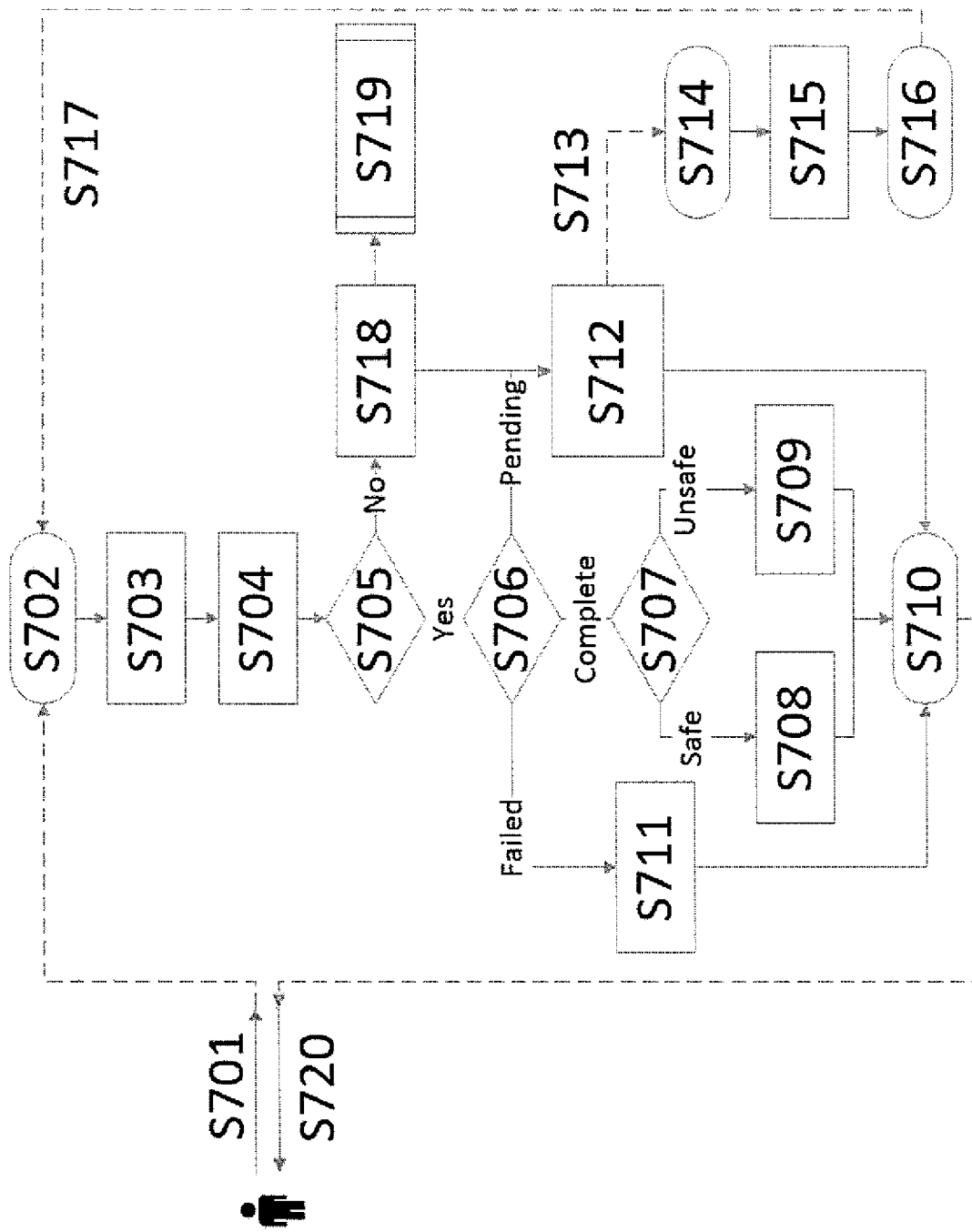
FIG. 7 is a schematic diagram of a procedure according to exemplary embodiments of the present invention.

FIG. 7 is a schematic diagram of a procedure according to exemplary embodiments of the present invention.

Namely, according to FIG. 7, main steps involved in processing a file that the user downloads (intends/requests the user to download) from Salesforce according to exemplary embodiments of the present invention are depicted. It is noted that the files may be downloaded e.g. by means of Salesforce's Chatter, Files, Libraries, Content and Notes&Attachments pages.

With respect to FIG. 7, it is noted that the dashed lines point to steps, which happen in background and initiated by Salesforce platform, such as calling trigger handlers and running scheduled/queueable jobs. Further, when the user downloads a file, it is likely that the file has been already scanned during the file upload process described above. In in such a case, according to exemplary embodiments of the present invention, the scan result is quickly retrieved from recent ContentScanJob objects (stored, and removed automatically upon completion) or from the Scan Result Cache records (stored and removed based on TTL or configurable time interval).

As is derivable from FIG. 7, the actual download of the intended file is suspended until it is determined that the file is considered safe. In the meantime, the user may be redirected to a substitution page (e.g. "scan in progress" page). Only in case the intended file is considered safe as a result of inquiring scanning results known from the above described uploading process, the download of the file will eventually begin.

Further, in case the intended file is considered unsafe, the user may be redirected to a further substitution page (e.g. "content blocked" page). In such case, download of the file will not be permitted.

Further, in case the scanning has failed for any reason, the user may be redirected to another substitution page (e.g. "scan failed" page). In such case, download of the file may not be permitted as well.

More specifically, in step S701, the user attempts to download a file with the web browser or mobile app.

In step S702, the ContentDownload handler is called with the content id. Further, in step S703, the download is disabled by setting the isDownloadAllowed flag to false. Further, in step S704, it is looked up for ContentScanJob object by the given content id.

In step S705, it is checked whether the ContentScanJob is found?

If so, in step S706, the status of the scan job is checked. If the status is "Complete", in step S707, the scan job result is checked. Further, if the status is "Failed", in step S711, the user is redirected to the Scan Failed page. Further if the status is "Pending", in step S712, the user is redirected to the Scan in Progress page, which may be refreshed automatically every e.g. 5 secs (configurable setting).

As mentioned above, in step S707, the scan job result is checked. If the result is "Safe", in step S708, the download is enabled by setting the isDownloadAllowed flag to true. If the result is "Unsafe", in step S709, the user is redirected to the Content Blocked page. In either case, in step S710, the ContentDownload handler execution is complete.

Starting from step S712, when the Scan in Progress page is refreshed (step S713), in step S714, the Scan-in-Progress page controller is called. Further, in step S715, the user is redirected by setting the page reference to the original file download link. Furthermore, in step S716, the Scan-in-Progress page controller execution ends. This causes the web browser to try downloading the file again (step S717).

If the ContentScanJob is not found in step S705, in step S718, a new ContentScanJob object with the content ID and status set to "New" is created and added. Further, in step S719, the procedure related to the ContentScanJob trigger of FIG. 6 (starting with step S608) is performed.

Finally, in step S720, the user receives the original file or one of the above-mentioned status pages.

In the foregoing, scanning tasks (and tasks for advanced threats identification) were described as being transmitted to the security cloud entity 23.

Figure 8:
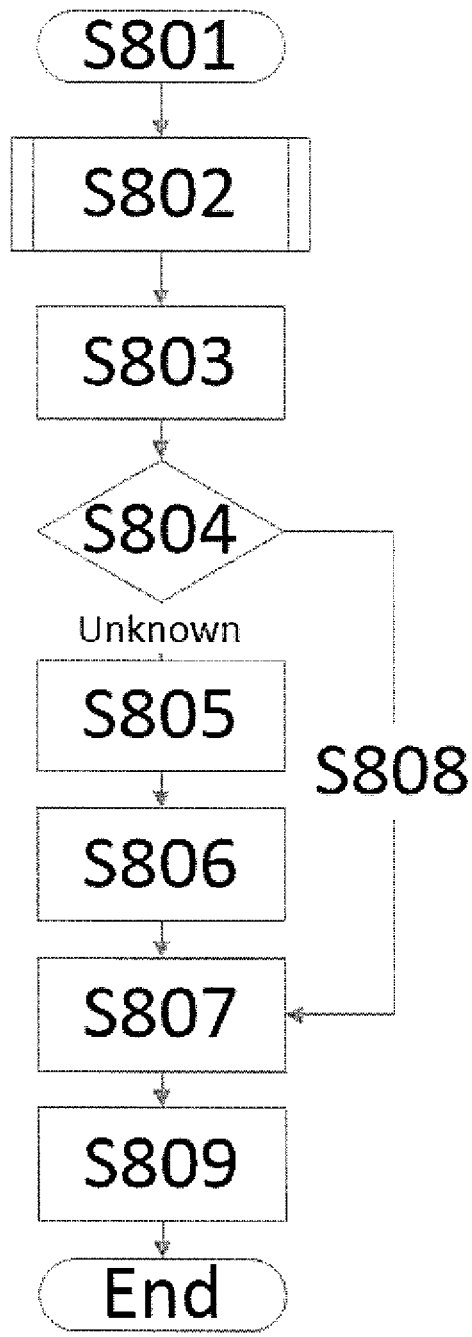
FIG. 8 is a schematic diagram of a procedure according to exemplary embodiments of the present invention.

FIG. 8 which is a schematic diagram of a procedure according to exemplary embodiments of the present invention explains how the exemplary F-Secure application (i.e., the direct service integration entity 24) interacts with the F-Secure Security Cloud (i.e. the security cloud entity 23) to check a given file (content) for malware or other advanced threats according to exemplary embodiments of the present invention.

For reasons of clarity and comprehensibility, FIG. 8 focuses only on interactions regarding checks for malware or other advanced threats. However, according to exemplary embodiments, e.g. sandbox API calls and logic may be added as well to the procedure shown in FIG. 8.

As is derivable from FIG. 8, based on e.g. a calculated SHA1 checksum of the file in question it is checked whether any results are present, and if not, scanning is instructed, and respective results are awaited and further processed (e.g. enriched with time to live information, stored, and afterwards utilized for assessment of the foregoing (e.g. upload) of pending (e.g. download) operation).

More specifically, in step S801, the mentioned interaction starts.

In step S802, API keys and other parameters are got to call F-Secure Security Cloud service(s). Further, in step S803, the SHA1 checksum is sent to F-Secure LORSP service, and a file reputation rating is got.

In step S804, the reputation rating is checked. If the file is unknown, in step S805, content of the file is read and sent to F-Secure ScanBox service. On the other hand, if the file is known and the rating is "Safe" or "Unsafe" (S808), the procedure proceeds further with step S807 described below.

In step S806, the scan result are got from the ScanBox service.

In step S807, the expiration time is calculated based on TTL (time to live) returned by the service or based on a configurable setting.

Subsequently, in step S809, a new Scan Result Cache object is created and saved with the scan result and the expiration time.

In step S810, the processing ends.

Figure 9:
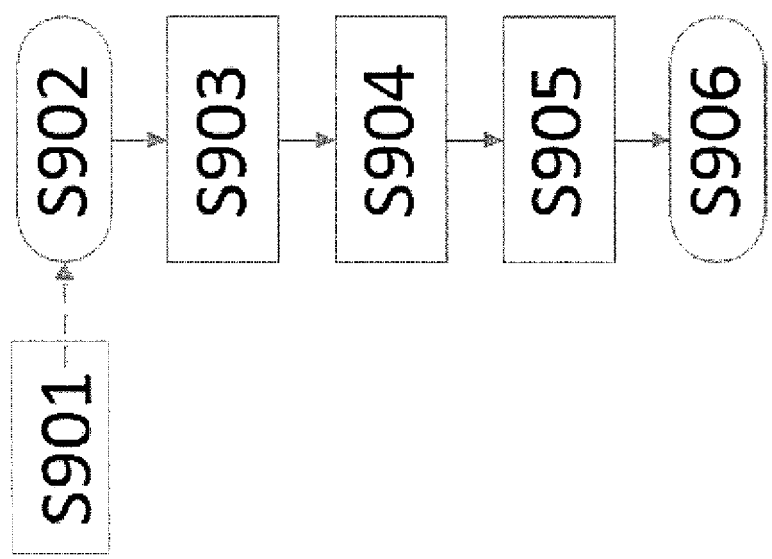
FIG. 9 is a schematic diagram of a procedure according to exemplary embodiments of the present invention.

FIG. 9 which is a further is a schematic diagram of a procedure according to exemplary embodiments of the present invention particularly depicts procedural steps of a scan result cache cleanup according to exemplary embodiments of the present invention.

As is derivable from FIG. 9, the F-Secure application stores scan results from F-Secure Security Cloud services in Scan Result Cache records, which are cleaned up automatically and periodically on the basis of a current time and an expiration time (corresponding to the time to live).

In particular, as soon as an expiration time assigned to a scan result cache result is less than the current time, the scan result cache record is selected for deletion and is subsequently deleted. In other words, in case an expiration time assigned to a scan result cache record is reached/expired, the scan result cache record is deleted.

More specifically, in step S901, Salesforce executes registered scheduled Apex jobs at their specified intervals.

In step S902, Scan Result Cache Cleanup job starts. In step S903, the current time is got. In step S904, all Scan Result Cache records where the expiration time is less than the current time are selected. In step S905, all selected Scan Result Cache records are deleted.

In step S906, Scan Result Cache Cleanup job ends.

The above-described procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 4, while for the sake of brevity reference is made to the detailed description of respective corresponding configurations/setups, schemes, methods and functionality, principles and operations according to FIGS. 1 to 3 and 5 to 9.

Figure 4:
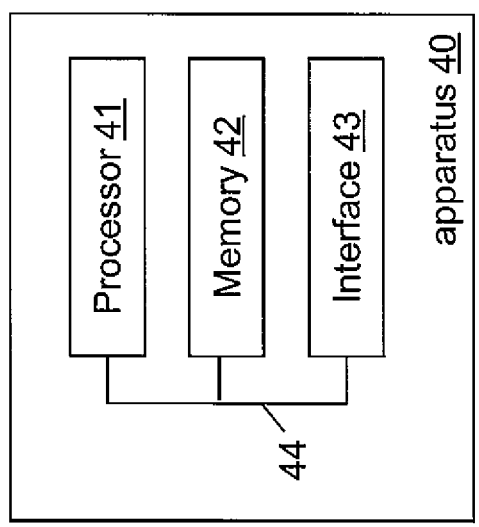
FIG. 4 is a block diagram illustrating an apparatus according to exemplary embodiments of the present invention.

In FIG. 4, the solid line blocks are basically configured to perform respective methods, procedures and/or functions as described above. The entirety of solid line blocks are basically configured to perform the methods, procedures and/or functions as described above, respectively. With respect to FIG. 4, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 4, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 4 shows a schematic diagram illustrating an example of a structure of an apparatus according to exemplifying embodiments of the present invention.

As indicated in FIG. 4, an apparatus 40 according to exemplifying embodiments of the present invention may comprise at least one processor 41 and at least one memory 42 (and possibly also at least one interface 43), which may be operationally connected or coupled, for example by a bus 44 or the like, respectively.

The processor 41 of the apparatus 40 is configured to read and execute computer program code stored in the memory 42. The processor may be represented by a CPU (Central Processing Unit), a MPU (Micro Processor Unit), etc., or a combination thereof. The memory 42 of the apparatus 40 is configured to store computer program code, such as respective programs, computer/processor-executable instructions, macros or applets, etc. or parts of them. Such computer program code, when executed by the processor 41, enables the apparatus 40 to operate in accordance with exemplifying embodiments of the present invention. The memory 42 may be represented by a RAM (Random Access Memory), a ROM (Read Only Memory), a hard disk, a secondary storage device, etc., or a combination of two or more of these. The interface 43 of the apparatus 40 is configured to interface with another apparatus and/or the user of the apparatus 40. That is, the interface 43 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 40 may, for example, represent a (part of a) system, such as (a component of) the file service cloud entity 22 (in particular the direct service integration entity 24) in FIG. 2, or may represent a (part of a) the security cloud entity 23 in FIG. 2. The apparatus 40 may be configured to perform a procedure and/or exhibit a functionality as described in any one of FIGS. 3 and 5 to 9.

When representing the (component of the) file service cloud entity 22 (in particular the direct service integration entity 24), the apparatus 40 or its processor 41 (possibly together with computer program code stored in the memory 42), in its most basic form, is configured to detect a transmission attempt of a file between a file service cloud entity and a remote accessing entity, to identify said file, to check for presence of a security threat scan result for said file in a scan result memory based on a result of said identifying, and to transmit, based on a result of said checking, a security threat scan task for said file to a security cloud entity connected to said file service cloud entity.

When representing the (part of the) security cloud entity 23, the apparatus 40 or its processor 41 (possibly together with computer program code stored in the memory 42), in its most basic form, is configured to provide at least file scanning capability.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 4 above, i.e. by one or more processors 41, one or more memories 42, one or more interfaces 43, or any combination thereof.

An apparatus according to exemplifying embodiments of the present invention, which represents the (component of the) file service cloud entity 22 (in particular the direct service integration entity 24), may comprise (at least) a unit or means for detecting a transmission attempt of a file between a file service cloud entity and a remote accessing entity, a unit or means for identifying said file, a unit or means for checking for presence of a security threat scan result for said file in a scan result memory based on a result of said identifying, and a unit or means for transmitting, based on a result of said checking, a security threat scan task for said file to a security cloud entity connected to said file service cloud entity.

An apparatus according to exemplifying embodiments of the present invention, which represents the (part of the) security cloud entity 23, may comprise (at least) a unit or means for providing at least file scanning capability.

For further details regarding the operability/functionality of the individual elements according to exemplifying embodiments of the present invention, reference is made to the above description in connection with any one of FIGS. 1 to 3 and 5 to 9, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java®, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for protection from malicious and/or harmful content in cloud-based service scenarios. Such measures exemplarily comprise detecting a transmission attempt of a file between a file service cloud entity and a remote accessing entity, identifying said file, checking for presence of a security threat scan result for said file in a scan result memory based on a result of said identifying, and transmitting, based on a result of said checking, a security threat scan task for said file to a security cloud entity connected to said file service cloud entity.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

LIST OF ACRONYMS AND ABBREVIATIONS

API application programming interfaces
CASE cloud access security brokers
CRM customer relationship management
GW gateway
HTTPS Hyper Text Transfer Protocol Secure
PaaS platform as a service
REST representational state transfer
SaaS software as a service
SMTP simple mail transfer protocol
SMTPS simple mail transfer protocol secure
SOAP simple object access protocol
UI user interface
URL uniform resource locator

The invention claimed is:
1. A method, comprising:
configuring a direct service integration entity with a trigger for a security threat scan task based on data objects comprising content identification of at least one of a content or a class of a file;
based on the configuring, performing at the direct service integration entity in a file service cloud entity of a multi-tenant cloud platform:
detecting a transmission attempt of a file between said file service cloud entity and a remote accessing entity associated with the multi-tenant cloud platform;
intercepting said file using an application programming interface provided to the direct service integration entity by a cloud service of the multi-tenant cloud platform;
in response to said intercepting, identifying with said data objects a content of said file, wherein the identifying comprises determining a hash value given by the content identification to identify the file;
based on the identifying, determining whether a scanning result was performed for the file;
based on determining a scanning result was not performed for the file, executing the trigger for the security threat scan task at the direct service integration entity in the file service cloud entity of a multi-tenant cloud platform;

detecting with the security threat scan task in a scan result memory a presence of a security threat scan result for said file assessing said file is malicious; and transmitting, based on said assessing said file as malicious, an indication of the detected security threat scan result for said file to a security cloud entity connected to said file service cloud entity, wherein the indication of said detected security threat scan result causes the security cloud entity to prohibit downloading of the file to the remote accessing entity associated with the multi-tenant cloud platform.

2. The method according to claim 1, further comprising receiving, from said security cloud entity, said security threat scan result for said file as a result of said security threat scan task for said file, and storing said security threat scan result for said file in said scan result memory.

3. The method according to claim 2, wherein said security threat scan result is provided with a time to live, and the method further comprising removing said security threat scan result from said scan result memory, if said time to live is expired.

4. The method according to claim 1, wherein based on determining a scanning result was performed for the file, the method comprising:

retrieving from scan result cache records the scan result for the file that was stored after scanning based on a time to live or a configurable time interval.

5. The method according to claim 1, wherein the trigger is associated with at least one of said data objects, a feed item, or a ContentVersion, and wherein the application programming interface comprises an API.

6. The method according to claim 1, wherein in relation to said detecting, said method further comprises receiving with the trigger an indication that said file is uploaded from said remote accessing entity to said file service cloud entity.

7. The method according to claim 6, said method further comprises based on said file being assessed as malicious, at least one of initiating an alert, removing said file from said file service cloud entity, and moving said file into a quarantine section of said file service cloud entity.

8. The method according to claim 5, wherein in relation to said detecting, said method further comprises receiving with the trigger an indication that said file is requested to be downloaded from said file service cloud entity to said remote accessing entity, and setting a download allowance state for said file such that download of said file is prohibited.

9. The method according to claim 1, wherein-said method comprises based on said file being assessed as not malicious, setting said download allowance state for said file such that said download of said file is permitted.

10. An apparatus comprising a memory configured to store computer program code, and a processor configured to read and execute computer program code stored in the memory, wherein the processor is configured to cause the apparatus to perform:

configuring at a direct service integration entity in a file service cloud entity of a multi-tenant cloud platform with a trigger for a security threat scan task based on data objects comprising at least one of a content or a class of a file to perform at the direct service integration entity:

detecting a transmission attempt of a file between said file service cloud entity and a remote accessing entity associated with the multi-tenant cloud platform, intercepting said file using an application programming interface provided to the direct service integration entity by a cloud service of the multi-tenant cloud platform, in response to said intercepting, identifying with said data objects a content of said file, wherein the identifying comprises determining a hash value given by the content identification to identify the file;

based on the identifying, determining whether a scanning result was performed for the file;

based on determining a scanning result was not performed for the file, executing the trigger for the security threat scan task at the direct service integration entity in the file service cloud entity of a multi-tenant cloud platform;

detecting with the security threat scan task in a scan result memory a presence of a security threat scan result for said file; and transmitting, based on said detecting, an indication of the detected security threat scan task result for said file to a security cloud entity connected to said file service cloud entity, wherein the indication of said detected security threat scan result causes the security cloud entity to prohibit downloading of the file to the remote accessing entity associated with the multi-tenant cloud platform.

11. The apparatus according to claim 10, wherein the processor is further configured to cause the apparatus to perform:

receiving, from said security cloud entity, said security threat scan result for said file as a result of said security threat scan task for said file, and storing said security threat scan result for said file in said scan result memory.

12. The apparatus according to claim 11, wherein said security threat scan result is provided with a time to live, and the processor is further configured to cause the apparatus to perform:

removing said security threat scan result from said scan result memory, if said time to live is expired.

13. The apparatus according to claim 10, wherein based on determining a scanning result was performed for the file, the method comprising:

retrieving from scan result cache records the scan result for the file that was stored after scanning based on a time to live or a configurable time interval.

14. The apparatus according to claim 10, wherein the trigger is associated with at least one of said data objects, a feed item, or a ContentVersion, and wherein the application programming interface comprises an API.

15. The apparatus according to claim 14, wherein in relation to said detecting, the processor is further configured to cause the apparatus to perform:

receiving-with the trigger an indication that said file is uploaded from said remote accessing entity to said file service cloud entity.

16. The apparatus according to claim 15, wherein the processor is further configured to cause the apparatus to perform:

based on said file being assessed as malicious, at least one of initiating an alert, removing said file from said file service cloud entity, and moving said file into a quarantine section of said file service cloud entity.

17. The apparatus according to claim 14, wherein in relation to said detecting, the processor is further configured to cause the apparatus to perform:

receiving with the trigger an indication that said file is requested to be downloaded from said file service cloud entity to said remote accessing entity, and setting a download allowance state for said file such that download of said file is prohibited.

18. The apparatus according to claim 10, wherein the processor is further configured to cause the apparatus to perform:

in case said file is assessed as not malicious, setting said download allowance state for said file such that said download of said file is permitted.

19. A non-transitory computer storage medium having stored thereon computer program code for implementing the method of claim 1.

20. The method according to claim 1, wherein the intercepting said file is using a link provided by the cloud service to utilize the application programming interface.

\* \* \* \* \*